United States Patent [19]

Lee et al.

[11] Patent Number: 5,117,135
[45] Date of Patent: May 26, 1992

[54] FREQUENCY AND PHASE DETECTION CIRCUIT IN NRZ BIT SYNCHRONOUS SYSTEM

[75] Inventors: Bhum C. Lee, Daejeon Chungnam; Kwon C. Park, Seo-gu Daejeon, both of Rep. of Korea

[73] Assignees: Electronics and Telecommunications Research Institute, Daejeon; Korea Telecommunication Authority, Seoul, both of Rep. of Korea

[21] Appl. No.: 454,160

[22] Filed: Dec. 21, 1989

[30] Foreign Application Priority Data

Dec. 22, 1988 [KR] Rep. of Korea ............... 1988-17260

[51] Int. Cl.⁵ .................... H03K 5/26; H03K 9/06
[52] U.S. Cl. .................... 307/514; 307/527; 307/471; 307/479; 328/133; 375/120
[58] Field of Search ............ 328/63, 133, 155; 307/511, 262, 271, 522, 527, 479, 471, 514, 516; 375/82, 120

[56] References Cited

U.S. PATENT DOCUMENTS

| 4,400,667 | 8/1983 | Belkin | 331/1 A |
| 4,422,176 | 12/1983 | Summers | 328/133 |
| 4,527,277 | 7/1985 | Kosaka et al. | 375/120 |
| 4,535,459 | 8/1985 | Hogge, Jr. | 375/120 |
| 4,571,738 | 2/1986 | Vance | 375/82 |
| 4,683,437 | 7/1987 | Javeri | 328/133 |
| 4,942,370 | 7/1990 | Shigemori | 331/1 A |

Primary Examiner—Timothy P. Callahan
Attorney, Agent, or Firm—Blakely, Sokoloff, Taylor & Zafman

[57] ABSTRACT

A frequency and phase detection circuit in an NRZ bit synchronous system by simultaneously retiming an NRZ input with an in-phase clock and an inverse-phase clock, respectively. A first frequency and phase difference is extracted by supplying the retimed NRZ with the in-phase clock and the delay-compensated NRZ input to an exclusive OR-gate. A second frequency and phase difference is extracted by supplying the retimed NRZ with the inverse-phase clock and the retimed NRZ with the in-phase clock to another exclusive OR-gate.

1 Claim, 1 Drawing Sheet

FREQUENCY AND PHASE DETECTION CIRCUIT IN NRZ BIT SYNCHRONOUS SYSTEM

BACKGROUND OF THE INVENTION

The present invention relates to a frequency and phase detection circuit in an NRZ bit synchronous system responsive to NRZ data and outputs from a voltage controlled oscillator (herein-after referred to as VCO) for regenerating a bit synchronous clock from the NRZ data.

In the prior art, a system suitable to retiming the phase of the generated clock after nonlinearly processing and filtering the inputted NRZ data for extracting a clock component driving the inputted NRZ data from the frequency spectrum of the inputted data was used.

Recently, in the bit synchronization system using PLL (Phase Locked Loop), the advanced frequency and phase detection circuit which can generate the transition clock in centre of the eve pattern of NRZ data, has been devised by Mr. Charles R. Hogge in U.S. Pat. No. 4,535,459. However, in this circuit devised by Mr. Hogge a difference in the phase of two output waveforms from the frequency and phase detection circuit always is present if the circuit does not include a delay element for delaying the clock by a half-period time interval of the clock driving the NRZ data such that a jitter component can occur in the VCO clock.

When using the delaying element in conjunction with the Hogge circuit, the upper limit frequency and the lower limit frequency in a fixed range may become asymmetrical since it is difficult to delay the clock exactly by a half-period because of the technical limit to the delaying element. A resulting disadvantage is that substantial capture range of PLL circuit is narrowed.

SUMMARY OF THE INVENTION

The objects of the present invention are to solve the problems as described above, to reduce jitter component, to be used in high rate and low rate data transmission using a general purpose logic element and to enable integration using simple logic elements.

In order to accomplish the above objects, the frequency and phase detection circuit in the NRZ bit synchronous system according to the present invention comprises an in-phase and inverse-phase clock generation means for generating in-phase and inverse-phase clocks of the clock of voltage controlled oscillator; a retiming means for retiming an inputted NRZ data with the in-phase and inverse-phase clocks from the in-phase and inverse clock generation means; a first phase difference extraction means for extracting the difference in the phase between the NRZ data retimed with the in-phase clock from the in-phase and inverse-phase clock generation means and the inputted NRZ data; and a second phase difference extraction means for extracting the difference in the phase between the NRZ data retimed with the in-phase clock from the in-phase and in-phase clock generation means and the NRZ data retimed with the phase clock, wherein an output from the first phase difference extraction means and an output from the second phase difference extraction means are compared and the frequency and phase are then detected.

BRIEF DESCRIPTION OF THE DRAWINGS

This invention will be further understood from the following description with reference to the accompanying drawing, in which.

DETAILED DESCRIPTION OF THE PREFERRED EMBODIMENTS

Figure 1:
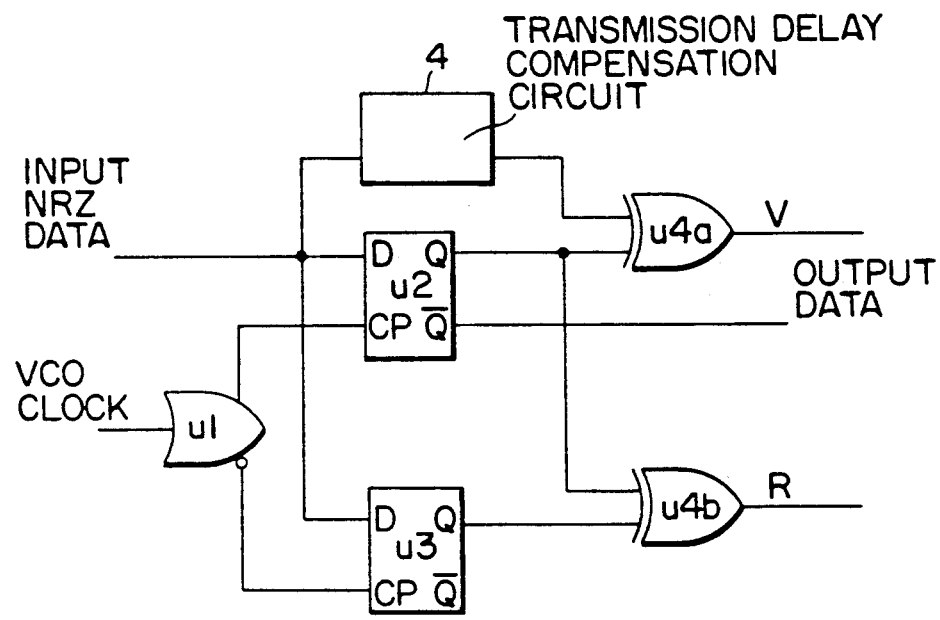
FIG. 1 shows a block diagram of the frequency and phase detection circuit in the NRZ bit synchronous system according to the present invention.

FIG. 1 shows a block diagram of the frequency and phase detection circuit in the NRZ bit synchronous system for explaining in detail the operation thereof.

Inputted NRZ data is applied to an exclusive OR gate U4a through a transmission delay compensation circuit 4, to a data input terminal D of D flipflop U2 and to a data input terminal D of a D flipflop U3.

The VCO clock is separated into an in-phase and an inverse-phase clock by the in-phase and inverse-phase generation circuit U1. Since the in-phase clock of the VCO clock is applied to a clock terminal CP of the D flipflop U2 and the inverse-phase clock of the VCO clock is applied to a clock terminal CP of the D flipflop U3. NRZ data from the flipflops U2 and U3 is retimed in turn each time transition in the VCO clock occurs.

Therefore, the retimed data of an output Q from the flipflop U2 and an output Q from the flipflop U3 are led or delayed by a half period of the VCO clock.

Accordingly, if the outputs Q from flipflops U2 and U3, respectively, are exclusive ORed, a time interval pulse (reference pulse) with its period of a half period of VCO clock is generated at the output terminal of the exclusive OR gate U4b whenever transition in the NRZ data occurs.

The output from the exclusive OR gate U4a depends on where the transition of the VCO clock is generated in bit interval of the eye pattern of the inputted NRZ data.

Since variation in the frequency and phase of the VCO clock relative to the inputted NRZ data thus may cause pulse width of the output from the exclusive OR gate U4a to be changed, it is possible to compare the frequency and phase of the clock driving the NRZ data in the NRZ synchronous system with the frequency and phase of the VCO clock.

Especially, the frequency and phase detection circuit causes the jitter component in VCO clock to be reduced since the circuit retimes the NRZ data with the in-phase and inverse-phase clocks of the VCO clock instead of retiming the NRZ data with the in-phase clock of the VCO clock and then retiming the retimed NRZ data with the inverse phase clock of the VCO clock.

Figure 2:
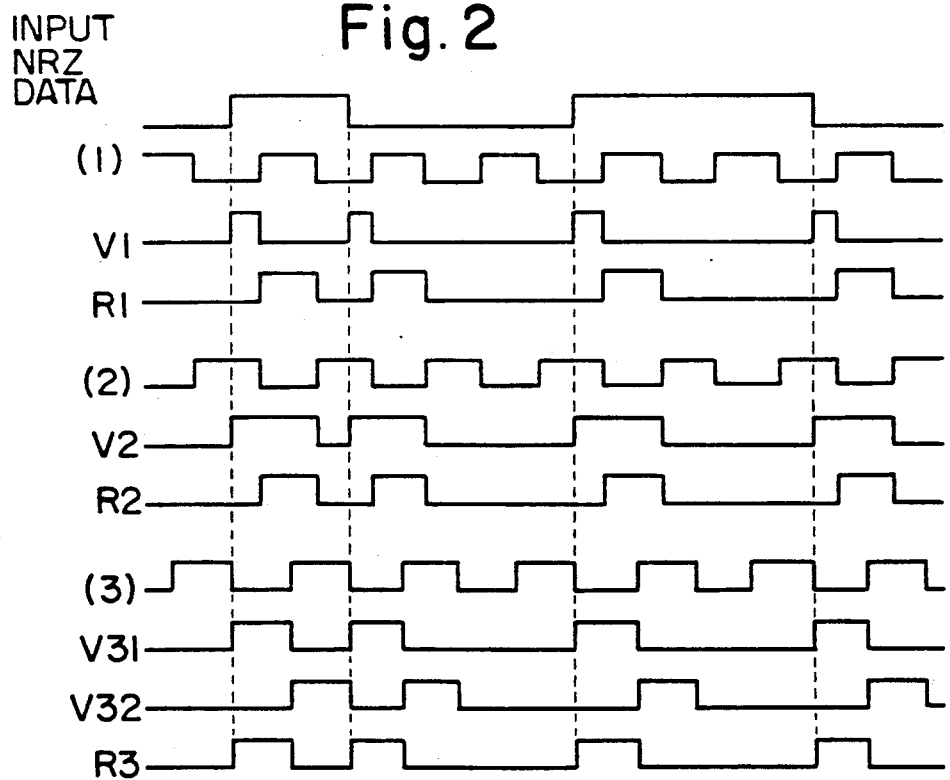
FIG. 2 shows a timing diagram for explaining the operation of the frequency and phase detection circuit according to the present invention.

The output waveform from the frequency and phase detection circuit in the NRZ bit synchronous system according to the clock of VCO will now be explained with reference to the timing diagram of the frequency and phase detection circuit of FIG. 2.

In the first case (1) in which the frequency or phase of the VCO clock leads the frequency or phase of the clock driving the NRZ data, the rising transition in the in-phase clock of the VCO clock occurs in advance relative to the center of the eye pattern of the inputted NRZ data and if the retimed NRZ data and the inputted NRZ data are exclusive ORed, the result becomes V1.

Since the pulse width of V1 is narrower than that of the reference pulse R1, it is possible to detect the difference in the frequency and phase.

In the second case (2) in which the frequency or phase of the VCO clock lags the frequency or phase of the clock driving the NRZ data, the rising transition in the in-phase clock of the VCO clock occurs later than the center of the eye pattern of the inputted NRZ data and if the retimed NRZ data and the inputted NRZ data are exclusive ORed, the result becomes V2. Since the pulse width of V2 is wider than that of reference pulse R2 and there is no difference in the phase between the two waveforms V2 and R2 unlike that in case (1), the jitter in VCO is reduced to a greater extent than case (1).

In the third case (3) in which the frequency or phase of the VCO clock is equal to the frequency or phase of the clock driving the NRZ data, the output from the exclusive OR gate U4a in FIG. 1 becomes V32 where the frequency or phase of the VCO clock lags somewhat relative to the frequency of phase of the clock driving the NRZ data. In the contrary case where the frequency or phase leads somewhat relative to the frequency or phase of the VCO clock driving the NRZ data, the output from the exclusive OR gate U4a becomes V31. Since waveforms of V31 and R3 are the same in pulse width and in phase, the difference in frequency of the waveforms and outputs V and R from the frequency between phase detection circuits becomes 0 even though the difference is not time integrated. Accordingly, the jitter component does not occur in the VCO.

Therefore, if the frequency of the VCO clock lags relative to the frequency of the clock driving the inputted NRZ data (in fact, due to the technical problems, it may be impossible that the frequency of the VCO clock is the same as that of the clock driving the NRZ data), the jitter component in the VCO clock due to the frequency and phase detection circuit can be reduced.

This invention is to detect the frequency and phase of the NRZ data using the simple logic element as described above and to substitute the conventional frequency and phase detection circuit and gives specific effect as follows:

First, this invention can remarkably reduce the jitter component in the VCO clock relative to the case where the conventional frequency and phase detection circuit in the NRZ bit synchronous system is used.

Second, this invention can be used in the low rate transmission as well as in high rate transmission because it is constructed with a general logic element.

Third, it is possible to integrate the circuit because it is constructed with a simple logic element.

What is claimed:

1. A frequency and phase difference detection circuit in an NRZ bit synchronous system, comprising:
   a first D-type flip-flop having a D input, a clock input and a logic output, said D input being coupled to receive an input NRZ data;
   a second D-type flip-flop having a D input, a clock input and a logic output, said D input being coupled in parallel with said first D-type flip-flop to receive said input NRZ data;
   a clock generation means for generating an in-phase clock and an inverse-phase clock from a clock input of a voltage controlled oscillator, said in-phase clock being coupled to said clock input of said first D-type flip-flop and said inverse-phase clock being coupled to said clock input of said second D-type flip-flop;
   a transmission delay compensation means for generating a delayed input NRZ data from said input NRZ data;
   a first exclusive OR-gate for extracting a first phase difference signal from inputs of said logic output of said first D-type flip-flop and said delayed input NRZ data; and
   a second exclusive OR-gate for extracting a second phase difference signal from inputs of said logic output of said second D-type flip-flop and from said logic output of said first D-type flip-flop;
   whereby said first and second phase difference signals are generated.

* * * * *

UNITED STATES PATENT AND TRADEMARK OFFICE
CERTIFICATE OF CORRECTION

PATENT NO.   : 5,117,135
DATED        : 05/26/92
INVENTOR(S)  : Lee et al.

It is certified that error appears in the above-identified patent and that said Letters Patent is hereby corrected as shown below:

| | | |
|---|---|---|
| col. 01, line 21 | delete "eve" | insert --eye-- |
| col. 01, line 62 | delete "phase" (first occurrence) insert --inverse phase-- | |
| col. 02, line 22 | after "in-phase" | insert --clock-- |
| col. 03, line 21 | after "frequency", delete "of" | insert --or-- |
| col. 03, line 42 | delete "the" | insert --for-- |
| col. 04, line 07 | delete "the" | |

Signed and Sealed this

Second Day of November, 1993

Attest:

BRUCE LEHMAN

Attesting Officer

Commissioner of Patents and Trademarks